March 1, 1960 W. J. LOHNINGER 2,927,216

PHOTOMETRIC CHARACTER RECOGNITION DEVICE

Filed Dec. 19, 1957 4 Sheets-Sheet 1

INVENTOR.

WILHELM J. LOHNINGER

BY

Eli Weiss

ATTORNEY

March 1, 1960 W. J. LOHNINGER 2,927,216

PHOTOMETRIC CHARACTER RECOGNITION DEVICE

Filed Dec. 19, 1957 4 Sheets-Sheet 2

INVENTOR.
WILHELM J. LOHNINGER
BY
Eli Weiss
ATTORNEY

March 1, 1960 W. J. LOHNINGER 2,927,216

PHOTOMETRIC CHARACTER RECOGNITION DEVICE

Filed Dec. 19, 1957 4 Sheets-Sheet 3

INVENTOR.
WILHELM J. LOHNINGER
BY
Eli Weiss
ATTORNEY

INVENTOR.
WILHELM J. LOHNINGER
BY
Eli Weiss
ATTORNEY

United States Patent Office 2,927,216
Patented Mar. 1, 1960

2,927,216

PHOTOMETRIC CHARACTER RECOGNITION DEVICE

Wilhelm J. Lohninger, Dover, N.J., assignor to Burroughs Corporation, Detroit, Mich., a corporation of Michigan Application December 19, 1957, Serial No. 703,794

20 Claims. (Cl. 250—217)

This invention relates generally to a character recognition device and more particularly to a device that photometrically analyzes and identifies a printed character.

Presently, intelligence bearing characters such as letters and numerals positioned to occupy specific areas on a record bearing medium can be identified automatically by one of a number of methods.

In one such method each character to be identified is scanned progressively line by line and the scan is sampled at various points for the presence or absence of a portion of the character. The areas selected for sampling are such that for black letters on a white background, each letter that can be identified will indicate a discrete pattern of black and white areas when scanned. This information pattern is then converted into electrical signals which are utilized, in combination with other generated signals, to identify the character presented.

Another method utilizes matching procedures wherein all or portions of the scanned characters are compared with indicia characteristics of the characters which can be recognized; in still another method the component parts of a character are counted; and in many other methods the characters must be presented in an unconventional form.

This invention discloses a new method of identifying characters printed in the usual form.

It is an object of this invention to provide a character recognition device that can identify a character without requiring either the progressive scanning of each character, the counting of the component parts of a character, or matching procedures wherein all portions of the scanned characters are compared with indicia characteristics of the characters which can be recognized.

It is still another object of this invention to provide a character recognition device that can identify accurately characters that are out of register.

It is an additional object of this invention to provide a character recognition device that can be programmed easily to identify preselected characters.

Other objects and many of the attendant advantages of this invention will be readily appreciated as the apparatus becomes better understood by reference to the following detailed description when considered in connection with the accompanying drawings wherein.

Figure 1:
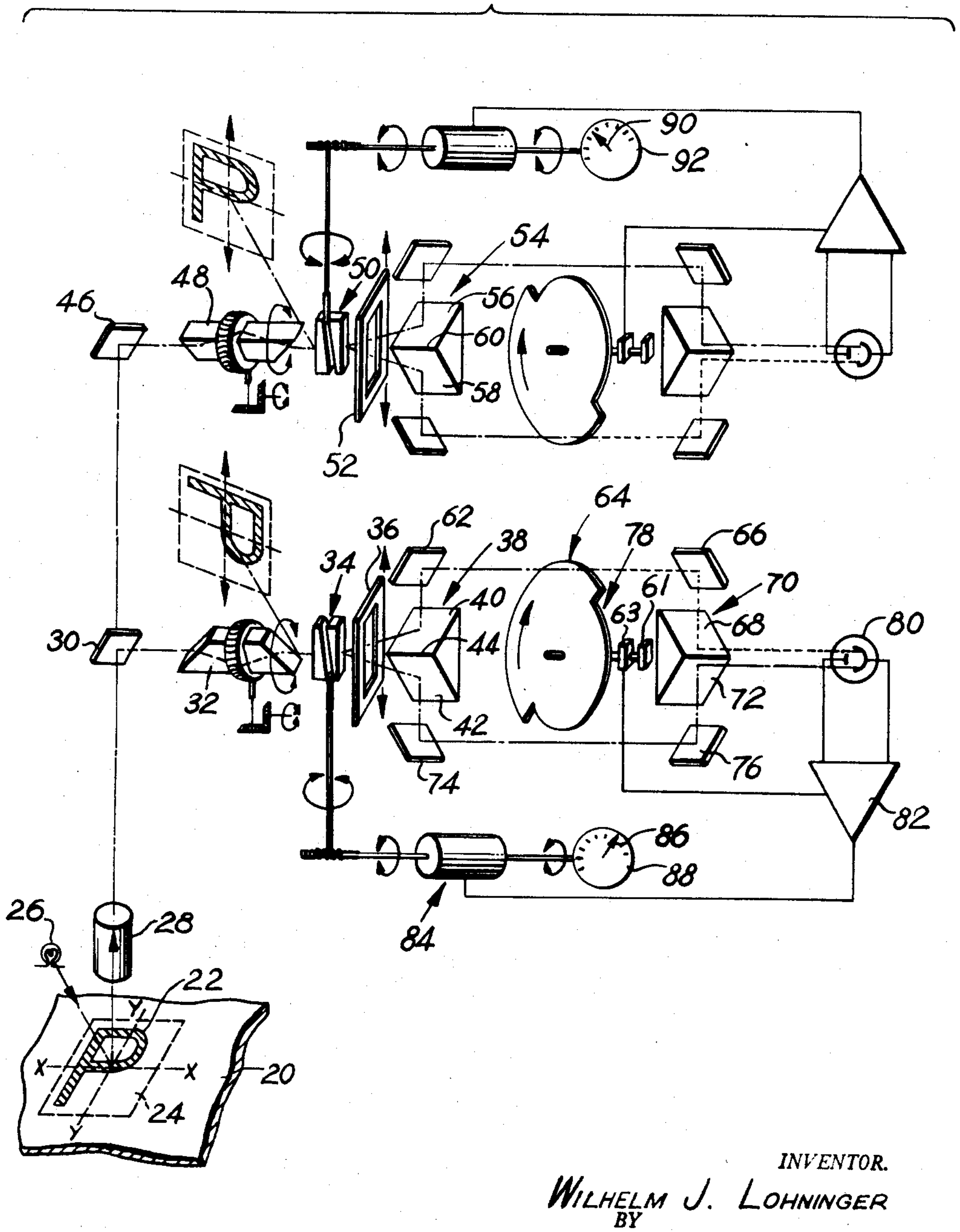
Fig. 1 illustrates structure in accordance with the principles of this invention for the identification of a conventional character.

Briefly, a record bearing medium supports a number of characters each positioned within an allotted area.

For purposes of explanation it shall be assumed that black characters are supported on a white background. The record bearing medium is oriented to display a particular character to an optical projector. In the ideal situation the black character does not reflect any light, therefore the light flux that is reflected by the record bearing medium is from the white background area bordering the presented character.

Light reflected from the white background area around the particular character is projected by the optical projector to an image splitting device which divides the projected image of the displayed character along a reference line into a first part and a second part. The total light flux of each part is measured and converted into a potential whose magnitude is proportional to the measured value. The two potentials are compared with each other and the differential obtained.

The differential signal is fed to a servo system which is coupled to orient the projected image relative to the image splitting device to reposition the projected image relative to the reference line until the total light flux from the first part is equal to the total light flux from the second part. The physical displacement of the projected image relative to the reference line at condition of balanced light flux will vary for different characters and, therefore, this displacement can be utilized to identify the displayed character presented.

In the identification of a large number of distinctive characters two or more different characters may produce the same displacement at balance. To prevent the generation of spurious results the character can be further divided to present two or more displacement values. In this instance the projected image of the displayed character will first be divided into two or more parts. The light flux from each part is then balanced about a separate reference line and two or more values representative of the displacement of the projected image relative to the reference lines from all of the initially split parts is obtained. The magnitude of the displacements are then utilized to more positively identify the projected character presented.

The projected image or each part of the projected image can be displaced angularly or along a straight line relative to a reference line.

In some instances where straight line translation of the presented characters is utilized it may be desirable to first optically reorient the image of the character through a particular angle, or the projected image may be divided to present two identical images, the normally vertical axis of one image being displaced angularly relative to the normally vertical axis of its twin image. In the last mentioned embodiment two values are obtained to define the character presented.

When the character presented is divided into twin images, identification can be obtained by angularly displacing each part relative to a reference line until a balance of the light flux is obtained; or one image can be displaced along a straight line while the other image is displaced angularly to obtain two values.

Thus, by utilizing linear displacement; angular displacements; or a combination of linear and angular displacements, discrete values or photometric centers can be obtained for each character presented for identification.

With reference to Fig. 1, a character bearing medium 20 contains characters each positioned within an allotted area 24. To facilitate the description of this invention and the explanation of its operations it shall be assumed that black characters are supported on a white background and that the characters are printed with a predetermined and precise orientation and spacing with respect to a reference line or area which can be the edges of the character bearing medium. A series of stops and guides are adapted to engage the edges of the record bearing medium to position accurately each character that is presented for identification.

For convenience it shall be assumed that the character "P" 22 is positioned within the allotted area 24 it being understood, however, that any other character (letter or numeral) can be contained within the allotted area and presented for identification.

A source of light 26 is positioned to illuminate uniformly the allotted area 24. An optical means such as collimator 28, positioned directly above the character 22, collects the light rays that emanate from the allotted area 24 and directs them to an image or optical dividing means such as a semi-reflecting surface or a half-silvered mirror 30 adapted to reflect half of the light directed to it and to transmit the remainder of the light. Since the character 22 is black and the background is white, the only light that passes through the collimator is the light that is reflected from the white allotted area 24 of the record bearing medium. The rays of light reflected by the half-silvered mirror 30 are directed to a reflecting surface or image splitting means such as prisms 38 after being passed through an image rotator or angular translating means such as a rotatable Dove or Pechan prism 32, a straight line translating means such as a rotatable compensation wedge unit 34, and a limiting means such as a mask 36. The prism 38 contains an upper silvered surface 40 and a lower silvered surface 42 each inclined towards each other to form a reference edge or line 44 at their line of contact.

The rays of light transmitted by half-silvered mirror 30 are redirected by a fully silvered mirror 46 to a reflecting surface or image splitting means such as prism 54 after being passed through an image rotator or angular translating means such as a rotatable Dove or Pechan prism 48, a straight line translating means such as a rotatable compensation wedge 50, and a limiting means such as a mask 52. The prism 54 contains an upper silvered surface 56 and a lower silvered surface 58 each inclined towards each other to form a reference edge or line 60 at their line of contact.

Thus, the available light from the collimator 28 is divided by the mirror 30 and directed by the mirrors 30 and 46 to provide two identical or twin images of the character "P" presented for identification. The rays of light of the image "P" directed towards the image splitting prism 38 shall be known as the first image; and those rays of light of the image "P" directed towards the image splitting prism 54 shall be known as the second image.

The reference lines 44 and 60 of the prisms 38 and 54 respectively are displaced equal light distances from the collimator to allow the light rays reflected by the allotted area 24 and picked up by the collimator 28 to be focused to the vertical planes that pass through the reference edges 44 and 60 of the prisms. Thus, the first image is focused to the reference edge 44, and the second image is focused to the reference edge 60.

Each rotatable Dove or Pechan prism can rotate the image it receives through an angular displacement relative to the reference line or edge of its respective image splitting prism. The prism 32 is initially oriented to rotate the first image of the character "P" 22 through an appropriate angle to align the vertical or Y—Y axis of the presented character "P" parallel with the reference edge 44 of the prism 38; and the prism 48 is oriented to rotate the second image of the character "P" 22 through an appropriate angle to align the horizontal or X—X axis of the presented characters "P" parallel with the reference edge 60 of the prism 54. The rotatable compensation wedge unit 34 can displace the first image vertically along a straight line relative to the reference edge 44; and the rotatable compensation wedge unit 50 can displace the second image vertically along a straight line relative to the reference edge 60. Thus, the wedge unit 34 positions the first image of the character "P" along its X—X axis; and the wedge unit 50 positions the second image of the character "P" along its Y—Y axis.

The inner cutout portions of the masks 36 and 52 define the areas of the first and second images transmitted to the prisms 38 and 54. The mask 36 can be oriented vertically relative to the reference edge 44 to determine a fixed physical position for the reference axis Y—Y; and the mask 52 can be oriented vertically relative to the reference edge 60 to determine a fixed physical position for the reference axis X—X.

Initially, it shall be assumed that the wedge unit 34 aligns the Y—Y axis of the first image with the reference edge 44; and the wedge unit 50 aligns the X—X axis of the second image with the reference edge 60.

The reference edge 44 of the prism 38 divides the first image into two parts; the top part is defined as that portion of the image that is received and reflected by the top inclined reflecting surface 40 of the prism 38; and the bottom part is defined as that portion of the image that is received and reflected by the bottom inclined reflecting surface 42 of the prism 38.

A reflecting surface 62 such as a mirror or the like receives the reflected top part of the first image from the reflecting surface 40 and directs it horizontally to a reflecting surface 66 (a mirror or the equivalent) which redirects the top part of the first image to an inclined reflecting surface 68 of a collecting prism 70. In a similar manner the lower part of the first image is directed by mirrors 74 and 76 to an inclined reflecting surface 72 of the collecting prism 70.

A light interrupting means such as an interrupter 64 having a cutaway area 78 is rotated at a constant speed by a motor 61 to alternately intercept the light rays that comprise the top and bottom parts of the first image. A light sensitive device or light measuring means 80 such as a photoelectric cell is positioned to detect and indicate the magnitude of the light transmitted by the collecting prism 70. Through the action of the interrupter, the light sensitive device 80 alternately senses the top and bottom parts of the first image.

The output signals from the light sensitive device are fed through a differential amplifier 82 to a servo motor 84. One end of the rotatable shaft of the servo motor is coupled through a worn gear to rotate the rotatable compensation wedge unit 34. The other end of the servo shaft is connected to position a pointer 86 which indicates, on a calibrated dial 88, the displacement of the shaft of the servo motor, and therefore the displacement of the wedge unit 34. Thus, the pointer and the calibrated dial function as an indicating means.

The rotary motion of the interrupter 64 alternately allows the top and bottom parts of the first image to be passed to the light sensitive device 80.

As mentioned previously, a black character 22 is positioned on a white background. Since a black area does not reflect light, then it must follow that the light received by the collimator must be that light reflected by the white background 24, not the light from the black character 22. The character "P," however, is not symmetrical about the Y—Y axis and, since the first image is oriented to align the Y—Y axis of the character "P" with the reference edge 44, the light sensitive device will indicate a higher value of light flux when it senses the bottom part of the first image than when it senses the top part of the first image.

This difference in light flux generates two different potentials at the output terminals of the light sensitive device 80; the potential from the bottom part being larger than the potential from the top part. Since the top and bottom parts are sensed alternately, the generated potentials representative of the top and bottom parts of the first image will also appear alternately, and have the configuration of a square wave when plotted against time. A switching device 63 coupled to the interrupter 64 and to the amplifier 82 indicates the part of the first image that is being sensed by the light sensitive device 80. The differential amplifier retards one of the signals until the other arrives and then compares the two signals to generate an output signal proportional to the differential of the two input signals. Rotation of the wedge unit 34 produces a straight line vertical displacement of the first image relative to the reference line 44. The signal from the amplifier is fed to the servo motor 84 which drives the rotatable compensation wedge unit 34 to position the first image around the reference line 44 to balance the light from the top and bottom parts around the reference line 44.

Figure 2:
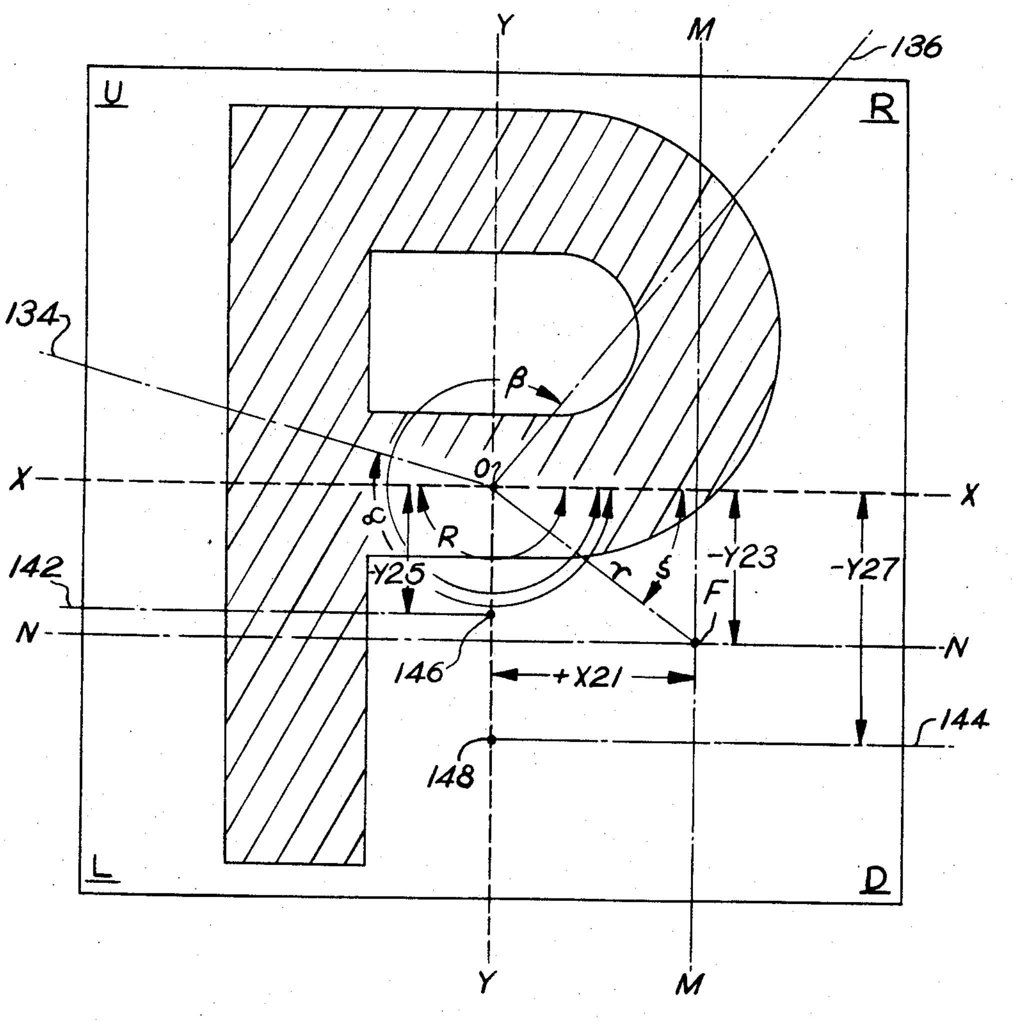
Fig. 2 is an enlarged view of a conventional character and its supporting area, illustrating character identifying areas and displacements.

To obtain a balance between the top and bottom parts, the first image is displaced by the rotatable compensation wedge unit 34 to effectively move the reference line 44 from the Y—Y axis to a new position corresponding to the line M—M (Fig. 2). This displacement is indicated by the pointer 86 and calibrated dial 88.

In a similar manner the second image is positioned relative to the reference edge 60 of the prism 54 to present a balance of light between its top and bottom parts around the reference line 60. At balance, the reference edge 60 is displaced from the X—X axis to a new position corresponding to the line N—N. This displacement is indicated by the pointer 90 and calibrated dial 92.

The values of the two displacements in rectangular coordinates is indicated by the point F (Fig. 2) which represents the photometric center of the allotted area 24 for the character "P."

It is the location of this point F as indicated by the two pointers that is utilized to identify the character presented for identification.

With further reference to Fig. 2, $\phi B$ is the reflected light flux from the black area or printed character; and $\phi W$ is the reflected light flux from the white area or background. The photometric axis N—N divides the allotted area 24 into a lower area D, and an upper area U. The reflected light fluxes from the lower area are designated as $\phi BD$ and $\phi WD$; and the reflected light fluxes from the upper area are designated as $\phi BU$ and $\phi WU$.

The photometric axis M—M divides the allotted area into a right area R, and a left area L. The reflected light fluxes from the right area are designated as $\phi BR$ and $\phi WR$; and those in the left area are designated as $\phi BL$ and $\phi WL$.

The position of the two photometric axis N—N and M—M are quantitatively determined by the photometric equations:

$$\phi BU+\phi WU=\phi BD+\phi WD$$

for the N—N axis; and $$\phi BR+\phi WR=\phi BL+\phi WL$$

for the M—M axis.

If the character displayed is black it will not reflect light and the value of the $\phi B$ components will be zero. Therefore, these components can be eliminated from each side of each equation.

The position of the photometric center F of the allotted area with respect to the geometric center O can be determined by either rectangular coordinates or polar coordinates. In rectangular coordinates F is at a point identified by +X21 and −Y23; and in polar coordinates F is at a point identified by:

$$r=\sqrt{X21^2+Y23^2}=Y \sin \xi=X \cos \xi$$

The photometric recognition of two dimensional characters such as letters or numerals consists of assigning to each character two or more photometric axis, or one or more photometric centers obtained by rectangular or polar coordinates. In each instance the coordinates will be discrete for each character presented.

The orientation of each mask 36 and 52 relative to its reference edge, and the angular displacement of the images of the presented character relative to the reference edges facilitates the identification of various characters.

Figures 3, 4:
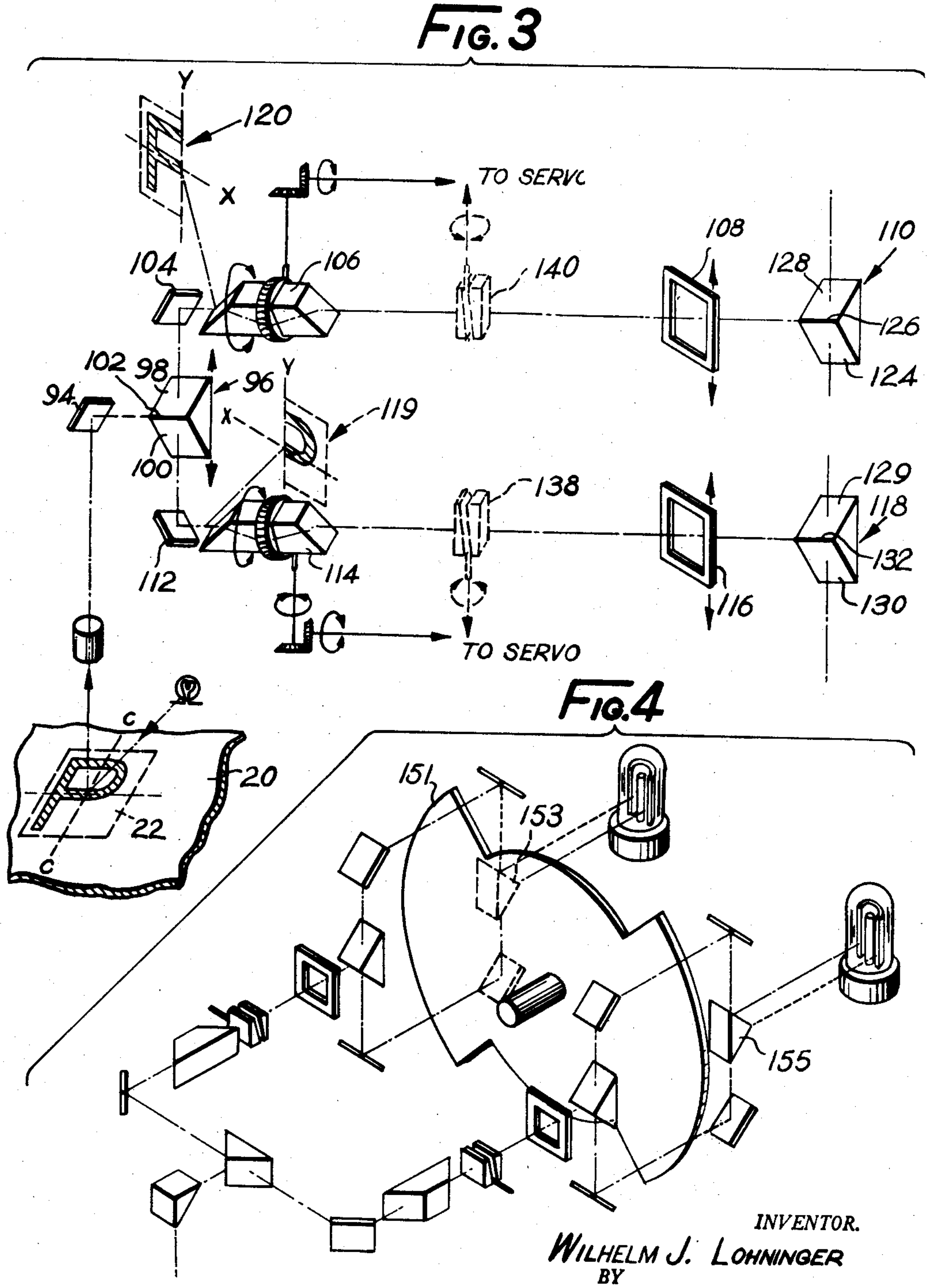
Fig. 3 illustrates another embodiment in accordance with the principles of this invention.
Fig. 4 illustrates the utilization of a single interrupter.

It is possible, however, to identify presented characters by utilizing other types of coordinate systems. With reference to Fig. 3, therein is disclosed a record bearing medium similar to that utilized in Fig. 2, and positioned and sensed by an optical means such as a collimator in the same manner. The image on the allotted area presented is sensed and then directed by a fully silvered mirror 94 onto a reflecting surface or an image splitting means such as a prism 96. The prism 96 contains an upper reflecting surface 98 and a lower reflecting surface 100, each inclined to contact each other along a dividing edge or line 102. The portion of the image that falls upon the upper surface 98 shall be referred to as the second image and it is directed by means of a mirror 104 to a reflecting surface or an image splitting means such as prism 110 after passing through an image rotator or angular translating means such as a rotatable Dove or Pechan prism 106, and a mask 108. The portion of the image that falls upon the lower surface 100 shall be referred to as the first image and it is directed by means of a mirror 112 to a reflecting surface or an image splitting means such as prism 118 after passing through an image rotator or angular translating means such as a rotatable Dove or Pechan prism 114, and a mask 116.

The image projected by the collimator is focused to a plane which passes through the dividing edge 102 of the prism 96 to divide the image along the line C—C. By further positioning the image splitting prism 96 up or down as indicated by the arrows, the division of the image can be arbitrarily varied to occur along a displaced axis positioned parallel to C—C. The first and second portions 119 and 120 respectively of the image reflected by the prism 96 are illustrated. The prism 110 contains an upper reflecting surface 128, and a lower reflecting surface 124, each inclined to contact each other to form a reference edge or line 126. The prism 118 contains an upper reflecting surface 129 and a lower reflecting surface 130 each inclined to contact each other to form a reference edge or line 132.

The second image directed to and split by the prism 110 and the first image directed to, and split by the prism 118 are each processed in the same manner described previously for the second and first images illustrated in Fig. 1. In Fig. 3, however, the servo system fed by the differential amplifier is coupled to rotate the rotatable Dove or Pechan prisms 106 and 114 which, when angularly oriented to a new position, angularly displaces the first and second images relative to the reference edges 132 and 126 respectively to obtain a balance of light of each image around its respective axis. A balance of light fluxes for the second image around the reference axis 126 occurs when the reference axis 126 is positioned along the line 134 (Fig. 2) which is identified by its angular displacement of $\alpha$ degrees; and a balance of light flux for the first image around the reference axis 132 occurs when the reference axis 132 is positioned along the line 136 which is identified by its angular displacement of $\beta$ degrees.

The angle $\alpha$ is indicated by a pointer and calibrated dial which measures the angular displacement of the prism 106 with respect to the reference axis 126; and the angle $\beta$ is indicated by a pointer and calibrated dial which measures the angular displacement of the prism 114 with respect to the reference axis 132. The function of the limiting means or masks 108 and 116 are the same in this embodiment as they are in Fig. 1.

Thus, Fig. 3 illustrates structure for the identification of a character by two angles $\alpha$ and $\beta$ as determined by the angular displacement of the rotatable Dove or Pechan prism 106 and 114 relative to the reference edges 132 and 126 respectively at balance of the light fluxes of the first image and the second image.

Referring again to Fig. 3, either or both of the first or second images from the prism 96 can be first displaced through a particular angle and then processed by straight line displacement rather than angular displacement of the image by utilizing a straight line translating means such as rotatable compensation wedge units 138, 140. Thus, rotatable compensation wedge units 138 and 140 can be substituted for either one or both of the rotatable prisms 106 and 114; or they can be inserted between the rotatable prisms and the masks. When straight line displacement of an image is desired the servo drive system must be disconnected from the rotatable prism and connected to the wedge unit.

If the first and second images from the prism 96 are oriented through the same angular displacement by the rotatable prisms 106 and 114, and the first and second images are then processed by the utilization of rotatable compensation wedge units 140 and 138 respectively, then the two portions of the image will be analyzed in a manner similar to that described for Fig. 1 to define two parallel photometric axis 142 and 144 (Fig. 2) which will intersect the Y—Y axis at the points 146 and 148 respectively. The point 146 is identified as —Y25, and the point 148 is identified as —Y27.

With reference to Figs. 1, 2 and 3 and the foregoing explanation, by producing two identical images with half-silvered mirrors or the equivalent, and by splitting each image with a prism, a mirror or the equivalent, the characters presented for identification can be divided into different parts by various types of photometric axis and photometric centers for identification and characterization as determined by the following:

A. Rectangular coordinates: $\pm X$ and $\pm Y$

B. Polar coordinates: $r=\sqrt{X^2+Y^2}=Y \sin \xi = X \cos \xi$

C. Angular magnitudes: $\alpha, \beta$ . . . (analogous to the coordinates represented by the hands of a clock), and D. Linear coordinates: —Y25, Y—27 . . . (analogous to the coordinates represented by the indications on a temperature or level scale)

The allotted area that supports a character presented for identification can be analyzed by producing two identical images or by splitting the image into two or more parts where each part is analyzed by one or more of the above mentioned coordinates A through D.

With reference to Fig. 4, there is disclosed structure for the identification of a character where a single light interrupting means such as interrupter 151 is utilized.

The interrupter 151 is utilized with structure disclosed in Figs. 1 or 3 to interrupt alternately the top and bottom parts of each image. At any particular instant each photoelectric cell receives only one part of its associated image. Switching devices, positioned by the rotatable shaft of the interrupter and connected to the differential amplifiers, indicates that part of each image that is being sensed by the photoelectric cell.

By modifying the interrupter to present a single cutout, and by directing the light from each collecting prism 153, 155 to a common collecting prism, a single interrupter and a single photoelectric cell can be utilized to obtain two photometric centers of each character presented for identification.

Figure 5:
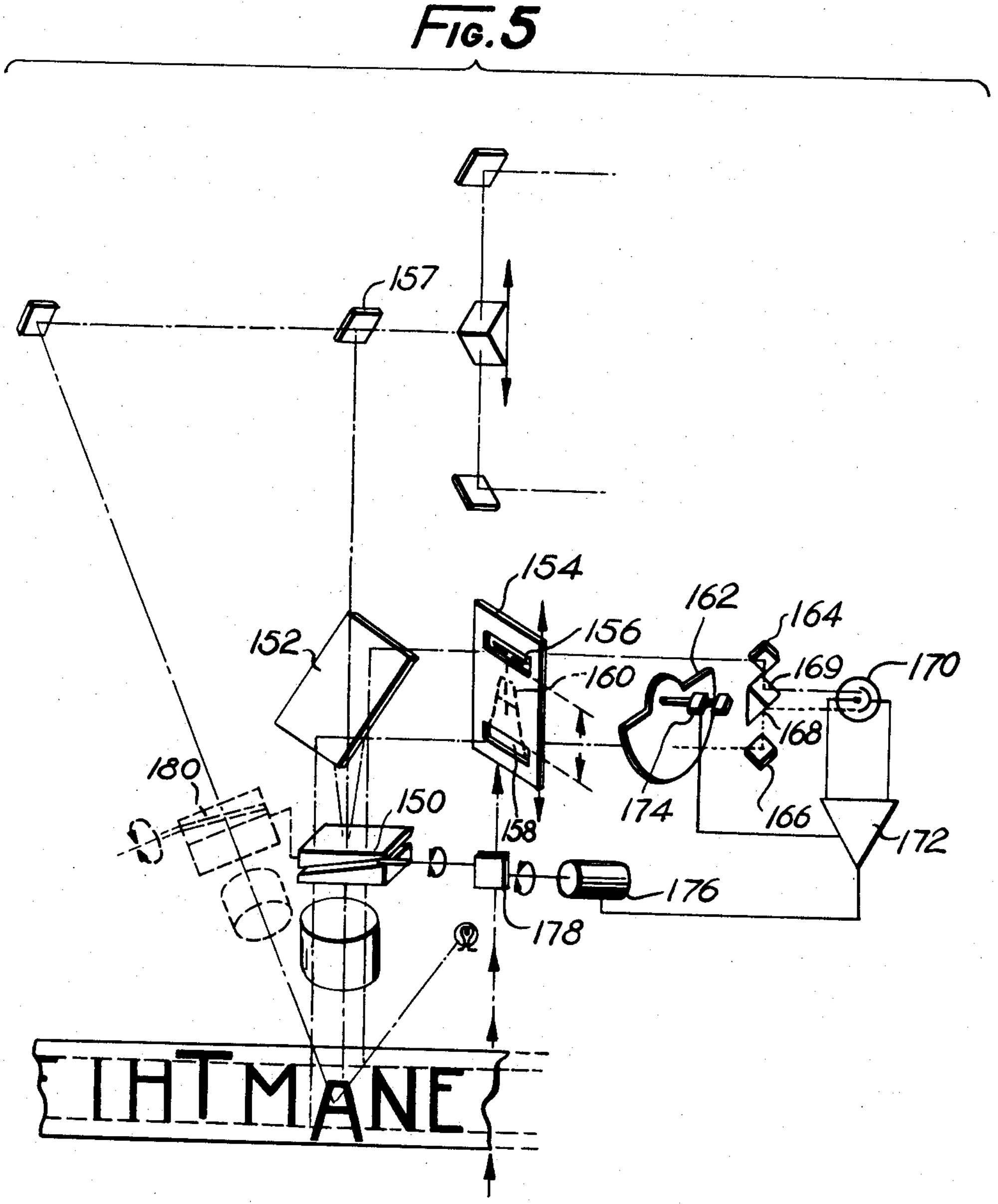
Fig. 5 illustrates structure for the optical alignment of characters printed out of register.

In some instances the characters that are to be identified may have been accidentally printed out of register to present characters that are misaligned relative to a predetermined reference line. Unless corrective procedures are utilized, all attempts to identify the misaligned character or characters will usually result in the generation of spurious results. With reference to Fig. 5, there is illustrated structure to optically orient a misaligned character to facilitate its accurate identification. A source of light illuminates a white allotted area on a record bearing medium which displays a black character which was accidentally printed out of register relative to a predetermined reference line. An optical means such as a collimator collects the reflected light from the displayed area of the record bearing medium to project an image of the character through a straight line translating means such as a rotatable compensation wedge unit 150 to an image or optical dividing means such as a semi-reflecting surface or half-silvered mirror 152. A portion of the available light is reflected by the half-silvered mirror 152 to a limiting means or an opaque mask 154, and the remainder is transmitted through the half-silvered mirror 152 to a mirror, or half-silvered mirror 157 for processing and identification by one or more of the methods previously described. The processing of the character for identification can not be initiated, however, until the character is accurately positioned.

The collimator focuses the image of the character to the mask 154 which contains two cutouts 156 and 158. The image is also focused to the reference line of the prisms utilized to obtain a balance of light flux. The portion of the opaque material 160 located between the two cutouts is equal to the height of the character presented; and the width of each cutout is smaller than the spacing between adjacent rows of characters to prevent the sensing of a portion of another character when the characters are positioned in horizontal rows, one below another.

A misaligned character will present a portion of itself (a dark area) to one or the other cutouts. In the case illustrated in Fig. 5, the lower portion of the character A will project through the cutout 158 while the cutout 156 will sense a completely white area to present an unbalance of light. The light from each cutout is alternately interrupted by a light interrupting means such as an interrupter 162; transmitted by two mirrors 164 and 166, and a collecting prism having two reflecting surfaces 168 and 169 to a light measuring means or light sensitive device 170 such as a photoelectric cell for detection. A differential amplifier 172 fed by said photoelectric cell detects and indicates the unbalance of light from the cutouts 156 and 158 in the same manner that an unbalance of light from the prism 38 of Fig. 1 is detected. A position indicator 174 oriented by the shaft of the interrupter 162 and connected to feed a signal to the amplifier 172 indicates the origin of the signal sensed by the photoelectric cell. The output signal from the amplifier 172 is fed to a servo motor 176 which is mechanically coupled, through a gear box 178, to orient the rotatable compensation wedge unit 150 in the proper direction. Rotation of the wedge unit 150 shifts the image of the presented character on the mirror 152 and the mask 154 to optically balance the light flux from the cutouts 156 and 158 by positioning the full character on the area 160 between the cutouts 156 and 158. After the character has been positioned the identification procedure can be initiated.

Characters which are printed in register will appear in the area 160 between the cutouts 156 and 158, and position correction procedures will not be required.

In another embodiment the reflected light from the allotted area is sensed by two collimators, one to project an image of the presented character to the mask 154 and the other to project an image of the same character to the analyzing and identifying structure. In this embodiment a second rotatable compensation wedge unit 180 is coupled directly to the first rotatable compensation wedge unit 150 to present a position corrected image for identification. The alignment processing unit is independent of the main processing beam path.

Correction of the position of the character A presented can also be accomplished by moving the mask 154 downward, or by moving the record bearing medium upwards.

In a similar manner a character that is misaligned upwards, to the left, or to the right can be optically repositioned.

Obviously, many modifications and variations of the present invention are possible in the light of the above teachings. It is therefore to be understood that within the scope of the appended claims the invention may be practiced otherwise than as specifically described.

What is claimed is:

1. A photometric device for identifying characters on a contrasting record bearing medium comprising optical means to transmit an image of a presented character, an image splitting means coupled to receive and divide the transmitted image around a reference line, light measuring means coupled to indicate a balance of light of said image around said reference line, orienting means fed by said light measuring means to position the image relative to the reference line to obtain a balance of light flux, and indicating means coupled to indicate the displacement of each part relative to a fixed position at balance to identify the character presented.

2. A photometric device for identifying characters on a contrasting record bearing medium comprising optical means to transmit an image of a presented character, an image dividing means coupled to receive and divide the transmitted image into a first part and a second part, light measuring means coupled to indicate a balance of light of said first part around a first reference line and said second part around a second reference line, orienting means fed by said light measuring means to position the first part relative to said first reference line and the second part relative to said second reference line to obtain two conditions of balance, and indicating means coupled to indicate the displacement of each part relative to a fixed position at balance to identify the character presented.

3. A photometric device for identifying characters on a contrasting record bearing medium comprising optical means to transmit an image of a presented character, an image dividing means coupled to receive and divide the transmitted image into a first part and a second part, light measuring means positioned to receive said first and second parts to indicate a balance of light of said first part around a first reference line and of said second part around a second reference line, straight line translating means controlled by said light measuring means to orient said first and second parts along straight lines relative to said first and second reference lines respectively to balance the light of said first part around said first reference line and to balance the light of said second part around said second reference line, and indicating means coupled to indicate the displacement of said straight line translating means relative to a fixed position at balance to identify the character presented.

4. A photometric device for identifying characters on a contrasting record bearing medium comprising optical means to transmit an image of a presented character, an image dividing means coupled to receive and divide the transmitted image into a first part and a second part, limiting means coupled to define the transmitted area received by said image dividing means, light measuring means coupled to indicate a balance of light of said first part around a first reference line and said second part around a second reference line, straight line translating means fed by said light measuring means to orient said first and second parts relative to the first and second reference lines respectively to obtain two conditions of balance, and indicating means coupled to indicate the displacement of said straight line translating means relative to a fixed position at balance to identify the character presented.

5. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a second image splitting means coupled to receive and split the second image around a second reference line into a first part and a second part, first light measuring means coupled to indicate a balance of light between said first and second parts of said first image, second light measuring means coupled to indicate a balance of light between said first and second parts of said second image, first straight line translating means interposed between said optical dividing means and said first image splitting means to orient the first image relative to said first reference line to produce a balance of light around said first reference line, second straight line translating means interposed between said optical dividing means and said second image splitting means to orient the second image relative to said second reference line to produce a balance of light around said second reference line, first indicating means coupled to said first straight line translating means to indicate a first value by measuring the displacement of the first straight line translating means relative to a fixed position at balance of said first image, and a second indicating means coupled to said second straight line translating means to indicate a second value by measuring the displacement of the second straight line translating means relative to a fixed position at balance of said second image.

6. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a first image rotator interposed between said optical dividing means and said first image splitting means to rotate the first image relative to said first image splitting means, a second image splitting means coupled to receive and split the second image around a second reference line into a first part and a second part, a second image rotator interposed between said optical dividing means and said second image splitting means to rotate the second image relative to said second image splitting means, first light measuring means coupled to indicate a balance of light between said first and second parts of said first image, second light measuring means coupled to indicate a balance of light between said first and second parts of said second image, first straight line translating means interposed between said first image rotator and said first image splitting means to orient the first image relative to said first reference line to produce a balance of light around said first reference line, second straight line translating means interposed between said second image rotator and said second image splitting means to orient the second image relative to said second reference line to produce a balance of light around said second axis, first indicating means coupled to indicate the displacement of said first straight line translating means relative to a fixed position at balance of said first image to indicate a first value, and second indicating means coupled to indicate the displacement of said second straight line translating means relative to a fixed position at balance of said second image to indicate a second value.

7. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a first rotatable prism interposed between said optical dividing means and said first image splitting means to rotate the first image relative to said first image splitting means, a second image splitting means coupled to receive and split the second image around a second reference line into a first part and a second part, a second rotatable prism interposed between said optical dividing means and said second image splitting means to rotate the second image relative to said second image splitting means, first light measuring means coupled to indicate a balance of light between said first and second parts of said first image, second light measuring means coupled to indicate a balance of light between said first and second parts of said second image, first rotatable compensation wedge unit interposed between said first rotatable prism and said first image splitting means to translate the first image along a straight line relative to said first reference line to produce a balance of light around said first reference line, second rotatable compensation wedge unit interposed between said second rotatable prism and said second image splitting means to translate the second image along a straight line relative to said second reference line to produce a balance of light around said second reference line, first indicating means coupled to indicate the displacement of said first rotatable compensation wedge unit relative to a fixed position at balance of said first image to indicate a first value, and second indicating means coupled to indicate the displacement of said second rotatable compensation wedge unit relative to a fixed position at balance of said second image to indicate a second value.

8. A photometric device for identifying characters on a contrasting record bearing medium comprising a collimator to transmit an image of a presented character, a semi-reflecting surface coupled to receive and divide the transmitted image into first and second identical images, a first reflecting surface coupled to receive and split the first image around a first reference line into a first part and a second part, a first rotatable prism interposed between said semi-reflecting surface and said first reflecting surface to rotate the first image relative to said first reflecting surface, a second reflecting surface coupled to receive and split the second image around a second reference line into a first part and a second part, a second rotatable prism interposed between said semi-reflecting surface and said second reflecting surface to rotate the second image relative to said second reflecting surface, first light measuring means coupled to indicate a balance of light between said first and second parts of said first image, second light measuring means coupled to indicate a balance of light between said first and second parts of said second image, first rotatable compensation wedge unit interposed between said first rotatable prism and said first reflecting surface to translate the first image along a straight line relative to said first reference line to produce a balance of light on each side, second rotatable compensation wedge unit interposed between said second rotatable prism and said second reflecting surface to translate the second image along a straight line relative to said second reference line to produce a balance of light on each side, first indicating means coupled to indicate the displacement of said first rotatable compensation wedge unit relative to a fixed position at balance of said first image to indicate a first value, and second indicating means coupled to indicate the displacement of said second rotatable compensation wedge unit relative to a fixed position at balance of said second image to indicate a second value.

9. A photometric device for identifying characters on a contrasting record bearing medium comprising a collimator to transmit an image of a presented character, a half-silvered mirror coupled to receive and divide the transmitted image into first and second identical images, a first reflecting surface coupled to receive and split the first image around a first reference line into a first part and a second part, a first Dove prism interposed between said half-silvered mirror and said first reflecting surface to rotate the first image relative to said first reflecting surface, a second reflecting surface coupled to receive and split the second image around a second reference line into a first part and a second part, a second Dove prism interposed between said half-silvered mirror and said second reflecting surface to rotate the second image relative to said second reflecting surface, first light measuring means coupled to indicate a balance of light between said first and second parts of said first image, second light measuring means coupled to indicate a balance of light between said first and second parts of said second image, a first rotatable compensation wedge unit interposed between said first Dove prism and said first reflecting surface to translate the first image along a straight line relative to said first reference line to produce a balance of light on each side, second rotatable compensation wedge unit interposed between said second Dove prism and said second reflecting surface to translate the second image along a straight line relative to said second reference line to produce a balance of light on each side, first indicating means coupled to indicate the displacement of said first rotatable compensation wedge unit relative to a fixed position at balance of said first image to indicate a first value, and second indicating means coupled to indicate the displacement of said second rotatable compensation wedge unit relative to a fixed position at balance of said second image to indicate a second value.

10. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a second image splitting means coupled to receive and split the second image around a second reference line into a first part and a second part, first limiting means interposed between said first image splitting means and said optical dividing means to define the transmitted area received by said first image splitting means, second limiting means interposed between said second image splitting means and said optical dividing means to define the transmitted area received by said second image splitting means, first light measuring means coupled to indicate a balance of light between said first and second parts of said first image, second light measuring means coupled to indicate a balance of light between said first and second parts of said second image, first straight line translating means interposed between said optical dividing means and said first image splitting means to orient the first image relative to said first reference line to produce a balance of light around said first reference line, second straight line translating means interposed between said optical dividing means and said second image splitting means to orient the second image relative to said second reference line to produce a balance of light around said second reference line, first indicating means coupled to indicate the displacement of said first straight line translating means relative to a fixed position at balance of said first image to indicate a first value, and a second indicating means coupled to indicate the displacement of said second straight line translating means relative to a fixed position at balance of said second image to indicate a second value.

11. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a second image splitting means coupled to receive and split the second image around a second reference line into a first part and a second part, first limiting means interposed between said first image splitting means and said optical dividing means to define the transmitted area received by said first image splitting means, second limiting means interposed between said second image splitting means and said optical dividing means to define the transmitted area received by said second image splitting means, first light measuring means coupled to indicate a balance of light between said first and second parts of said first image, first light interrupting means interposed between said first light measuring means and said first image splitting means to alternately pass said first and second parts of said first image, second light measuring means coupled to indicate a balance of light between said first and second parts of said second image, second light interrupting means interposed between said second light measuring means and said second image splitting means to alternately pass said first and second parts of said second image, first straight line translating means interposed between said optical dividing means and said first image splitting means to orient the first image relative to said first reference line to produce a balance of light around said first reference line, second straight line translating means interposed between said optical dividing means and said second image splitting means to orient the second image relative to said second reference line to produce a balance of light around said second reference line, first indicating means coupled to indicate the displacement of said first straight line translating means relative to a fixed position at balance of said first image to indicate a first value, and a second indicating means coupled to indicate the displacement of said second straight line translating means relative to a fixed position at balance of said second image to indicate a second value.

12. A photometric device for identifying characters on a contrasting record bearing medium comprising optical means to transmit an image of a presented character, an image dividing means coupled to receive and divide the transmitted image into a first part and a second part, light measuring means positioned to receive said first and second parts to indicate a balance of light of said first part around a first reference line and of said second part around a second reference line, translating means controlled by said light measuring means to orient said first and second parts angularly relative to said first and second reference lines respectively to balance the light of said first part around said first reference line and to balance the light of said second part around said second reference line, and indicating means coupled to said translating means to identify the character presented by indicating the displacement of each part relative to a fixed position.

13. A photometric device for identifying characters on a contrasting record bearing medium comprising optical means to transmit an image of a presented character, an image dividing means coupled to receive and divide the transmitted image into a first part and a second part, limiting means coupled to define the transmitted area received by said image dividing means, light measuring means coupled to indicate a balance of light of said first part around a first reference line and said second part around a second reference line, angular translating means fed by said light measuring means to orient said first and second parts angularly relative to the first and second reference lines respectively to obtain two conditions of balance, and indicating means coupled to said angular translating means to identify the character presented by indicating the displacement of each part at balance relative to a fixed position.

14. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a second image splitting means coupled to receive and split the second image around a second reference line into a first part and a second part, first light measuring means coupled to indicate a balance of light between said first and second parts of said first image, second light measuring means coupled to indicate a balance of light between said first and second parts of said second image, first angular translating means interposed between said optical dividing means and said first image splitting means to orient the first image angularly relative to said first reference line to produce a balance of light around said first reference line, second angular translating means interposed between said optical dividing means and said second image splitting means to orient the second image angularly relative to said second reference line to produce a balance of light around said second reference line, first indicating means coupled to indicate the displacement of said first angular translating means relative to a fixed position at balance of said first image to indicate a first value, and second indicating means coupled to indicate the displacement of said second angular translating means relative to a fixed position at balance of said second image to indicate a second value.

15. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a first image rotator interposed between said optical dividing means and said first image splitting means to rotate the first image relative to said first image splitting means, a second image splitting means coupled to receive and split the second image around a second reference line into a first part and a second part, a second image rotator interposed between said optical dividing means and said second image splitting means to rotate the second image relative to said second image splitting means, first light measuring means coupled to indicate a balance of light between said first and second parts of said first image, second light measuring means coupled to indicate a balance of light between said first and second parts of said second image, first angular translating means interposed between said first image rotator and said first image splitting means to orient the first image angularly relative to said first reference line to produce a balance of light around said first reference line, second angular translating means interposed between said second image rotator and said second image splitting means to orient the second image angularly relative to said second reference line to produce a balance of light around said second reference line, first indicating means coupled to indicate the displacement of said first angular translating means relative to a fixed position at balance of said first image to indicate a first value, and second indicating means coupled to indicate the displacement of said second angular translating means relative to a fixed position at balance of said second image to indicate a second value.

16. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a second image splitting means coupled to receive and split the second image around a second reference line into a first part and a second part, first limiting means interposed between said first image splitting means and said optical dividing means to define the transmitted area received by said first image splitting means, second limiting means interposed between said second image splitting means and said optical dividing means to define the transmitted area received by said second image splitting means, first light measuring means coupled to indicate a balance of light between said first and second parts of said first image, second light measuring means coupled to indicate a balance of light between said first and second parts of said second image, first angular translating means interposed between said optical dividing means and said first image splitting means to angularly orient the first image relative to said first reference line to produce a balance of light around said first reference line, second angular translating means interposed between said optical dividing means and said second image splitting means to angularly orient the second image relative to said second reference line to produce a balance of light around said second reference line, first indicating means coupled to indicate the displacement of said first angular translating means relative to a fixed position at balance of said first image to indicate a first value, and second indicating means coupled to indicate the displacement of said second angular translating means relative to a fixed position at balance of said second image to indicate a second value.

17. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a second image splitting means coupled to receive and split the second image around a second reference line into a first part and a second part, first limiting means interposed between said first image splitting means and said optical dividing means to define the transmitted area received by said first image splitting means, second limiting means interposed between said second image splitting means and said optical dividing means to define the transmitted area received by said second image splitting means, first light measuring means coupled to indicate a balance of light between said first and second parts of said first image, first interrupting means interposed between said first light measuring means and said first image splitting means to alternately pass said first and second parts of said first image, second light measuring means coupled to indicate a balance of light between said first and second parts of said second image, second interrupting means interposed between said second light measuring means and said second image splitting means to alternately pass said first and second parts of said second image, first angular translating means interposed between said optical dividing means and said first image splitting means to angularly orient the first image relative to said first reference line to produce a balance of light around said first reference line, second angular translating means interposed between said optical dividing means and said second image splitting means to angularly orient the second image relative to said second reference line to produce a balance of light around said second reference line, first indicating means coupled to indicate the displacement of said first angular translating means relative to a fixed position at balance of said first image to indicate a first value, and second indicating means coupled to indicate the displacement of said second angular translating means relative to a fixed position at balance of said first image to indicate a second value.

18. A photometric device for identifying characters on a contrasting record bearing medium comprising optical means to transmit an image of a presented character, optical dividing means coupled to receive and divide the transmitted image into first and second identical images, a first image splitting means coupled to receive and split the first image around a first reference line into a first part and a second part, a rotatable prism interposed between said optical dividing means and said first image splitting means to rotate the first image relative to said first image splitting means to produce a balance of light around said first reference line, a second image splitting means coupled to receive and split the second image around a second reference line into a first part and a second part, a compensation wedge unit interposed between said optical dividing means and said second image splitting means to orient the second image along a straight line relative to said second image splitting means to produce a balance of light around said second reference line, light measuring means coupled to indicate a balance of light between said first and second parts of each image, first indicating means coupled to indicate the displacement of said rotatable prism relative to a fixed position at balance of said first image to indicate a first value, and second indicating means coupled to indicate the displacement of said compensation wedge unit relative to a fixed position at balance of said second image to indicate a second value.

19. A photometric device for identifying characters on a contrasting record bearing medium comprising a collimator to transmit an image of a presented character, a semi-reflecting surface coupled to receive and divide the transmitted image into first and second identical images, a first reflecting surface coupled to receive and split the first image around a first reference line into a first part and a second part, a rotatable prism interposed between said semi-reflecting surface and said first reflecting surface to rotate the first image relative to said first reference line to produce a balance of light around said first reference line, a second reflecting surface coupled to receive and split the second image around a second reference line into a first part and a second part, a compensation wedge unit interposed between said semi-reflecting surface and said second reflecting surface to displace the second image along a straight line relative to said second reference line to produce a balance of light around said second reference line, first light measuring means coupled to indicate a balance of light between said first and second parts of said first image, second light measuring means coupled to indicate a balance of light between said first and second parts of said second image, first indicating means coupled to indicate the displacement of said rotatable prism relative to a fixed position at balance of said first image to indicate a first value, and second indicating means coupled to indicate the displacement of said compensation wedge unit relative to a fixed position at balance of said second image to indicate a second value.

20. A photometric device for identifying characters on a contrasting record bearing medium comprising a collimator to transmit an image of a presented character, a semi-reflecting surface coupled to receive and divide the transmitted image into first and second identical images, a first reflecting surface coupled to receive and split the first image around a first reference line into a first part and a second part, a rotatable prism interposed between said semi-reflecting surface and said first reflecting surface to rotate the first image relative to said first reference line to produce a balance of light around said first reference line, a second reflecting surface coupled to receive and split the second image around a second reference line into a first part and a second part, a compensation wedge unit interposed between said semi-reflecting surface and said second reflecting surface to displace the second image along a straight line relative to said second reference line to produce a balance of light around said second reference line, first limiting means interposed between said first reflecting surface and said rotatable prism to define the transmitted area received by said first reflecting surface, second limiting means interposed between said second reflecting surface and said compensation wedge unit to define the transmitted area received by said second reflecting surface, light measuring means coupled to indicate a balance of light between said first and second parts of each image, first indicating means coupled to indicate the displacement of said rotatable prism relative to a fixed position at balance of said first image to indicate a first value, and second indicating means coupled to indicate the displacement of said compensation wedge unit relative to a fixed position at balance of said second image to indicate a second value.

References Cited in the file of this patent

UNITED STATES PATENTS

| | | |
|---|---|---|
| 1,838,389 | Goldberg | Dec. 29, 1931 |
| 2,211,320 | Efron | Aug. 13, 1940 |
| 2,294,679 | Maul | Sept. 1, 1942 |
| 2,362,004 | Heidinger | Nov. 7, 1944 |
| 2,479,309 | Cave-Browne-Cave | Aug. 16, 1949 |
| 2,525,445 | Canada | Oct. 10, 1950 |
| 2,548,755 | Vossberg et al. | Apr. 10, 1951 |
| 2,552,156 | De France | May 8, 1951 |